United States Patent
Sarkar et al.

(10) Patent No.: US 12,177,576 B2
(45) Date of Patent: Dec. 24, 2024

(54) DYNAMIC RANGE ENHANCEMENT IN CMOS IMAGE SENSORS USING CHARGE TRANSFER AMPLIFICATION

(71) Applicant: DV2JS INNOVATION LLP., New Delhi (IN)

(72) Inventors: Mukul Sarkar, New Delhi (IN); Neha Priyadarshini, New Delhi (IN)

(73) Assignee: DV2JS INNOVATION LLP., New Delhi (IN)

( * ) Notice: Subject to any disclaimer, the term of this patent is extended or adjusted under 35 U.S.C. 154(b) by 0 days.

(21) Appl. No.: 17/670,769

(22) Filed: Feb. 14, 2022

(65) Prior Publication Data
US 2022/0263996 A1 Aug. 18, 2022

(30) Foreign Application Priority Data
Feb. 15, 2021 (IN) .............................. 202111006234

(51) Int. Cl.
*H04N 23/741* (2023.01)
*H04N 23/73* (2023.01)
*H04N 23/76* (2023.01)

(52) U.S. Cl.
CPC ........... *H04N 23/741* (2023.01); *H04N 23/73* (2023.01); *H04N 23/76* (2023.01)

(58) Field of Classification Search
CPC ...... H04N 23/741; H04N 23/73; H04N 23/76; H04N 25/75; H04N 25/767; H04N 25/57
See application file for complete search history.

(56) References Cited

U.S. PATENT DOCUMENTS

| | | | | |
|---|---|---|---|---|
| 7,492,399 B1 * | 2/2009 | Gulbransen | ............ | H04N 25/77 348/294 |
| 10,999,521 B2 * | 5/2021 | Maeta | .................... | H04N 25/53 |

* cited by examiner

*Primary Examiner* — Twyler L Haskins
*Assistant Examiner* — Angel L Garces-Rivera
(74) *Attorney, Agent, or Firm* — Renner, Kenner, Greive, Bobak, Taylor & Weber

(57) ABSTRACT

A method and a system are described for dynamic range enhancement in CMOS image sensors using charge-transfer amplification. The method involves resetting a pixel array and other nodes of the CMOS image sensor. It involves receiving light for a predetermined duration on the pixel array layered with photodiodes. It involves configuring an integration time of incident light at the photodiodes 104, for a desired exposure and releasing photoelectrons to form a current signal. An equivalent voltage signal is built allowing a voltage build-up by charging a storage capacitance, and thereafter adjusting the voltage build-up by adjusting a ratio between the storage capacitance and amplification capacitance. The voltage signal is then integrated with the current signal in order to obtain an integrated signal of amplified gain, and the method involves generating a resultant electronic signal with a higher amplification factor and an enhanced gain as compared to the input electronic signal.

21 Claims, 4 Drawing Sheets

DYNAMIC RANGE ENHANCEMENT IN CMOS IMAGE SENSORS USING CHARGE TRANSFER AMPLIFICATION

FIELD OF THE INVENTION

The present disclosure relates to an improved high dynamic range CMOS image sensor and more specifically to a method of enhancement of the dynamic range of a CMOS image sensor by configuring a variable gain using charge transfer amplification.

BACKGROUND OF THE INVENTION

Digital photography has advanced in leaps and bounds, incorporating features of advanced cameras in compact photographic devices due to rapid developments in image processing techniques. In spite of the technological advancements, photography in low light conditions still poses a challenge to technologists working in this field. Even the state-of-the-art advanced cameras have failed to provide better efficiency and high resolution of picture in low-light conditions.

In general, many of the high dynamic range enhancement techniques for CMOS image sensors using simple circuit design modifications are used for the high light regime. Targeting low light regime is more challenging. For low light imaging, the pixel gain should be enhanced in a controlled manner. The solutions for pixel gain enhancement become bulkier and power hungry.

A majority of camera sensors generally employ CMOS (Complementary Metal Oxide Semiconductors) image sensors for digital image processing. Obtaining an output image with a high resolution and clarity would depend on the CMOS sensor. An efficient CMOS sensor must be able to operate when it is exposed to all sort of light intensities. A CMOS sensor's operation is mostly challenged when there is an absence of sufficient light to generate a corresponding electric signal for further processing to render a high-quality output. There are image sensors available, which focusses on attending to the problems of low-light photography. However, the images rendered are of an inferior resolution and are normally laden with noise signals. This is because the input signal is weak due to presence of a fewer number of photons. As a result, a weak photoelectric signal is generated with a low voltage. Traditionally, state-of-the-art sensors amplify this low-level voltage signal in order to obtain a high gain, to output a refined image. This process consumes more power and makes the digital camera expensive and less effective.

Availability of light is a fundamental requirement for any digital camera, to process a captured image and render a high-resolution image as an output. This is the very reason why photography in low-light conditions renders an image of inferior quality. Obtaining a high-resolution image in low-light conditions is very important when it comes to applications, inter alia, in medical equipment and warfare equipment. For instance, low-light imaging finds a necessary use in endoscopic capsule, fluorescence microscopy, astrophotography, night-vision optics and other surveillance applications.

Traditionally, sensors like CCD (Charged Coupled Device), Electron bombardment CCDs, photomultiplier tubes, SPADs (Single Photon Avalanche Diodes) and conventional CMOS sensors are used in digital cameras for low-light photography. Conventional CCD image sensors were intended for low noise and high gain imaging. In an electron bombardment CCD, a photocathode made from GaAs, GaAsP (Gallium Arsenide and Gallium Arsenide Phosphide as substrates) is used for emission of photoelectrons in vacuum. Further, a high electric field is applied to accelerate the photoelectrons at high velocities and they are bombarded on the anode (Silicon). This creates additional electron-hole pairs and thus the gain is provided. These imaging systems are costly. Further, the gain factor in traditional sensors is non-linear over time.

Additionally, voltage amplifiers are used in a pixel or in a column circuit of a CMOS image sensor for supplementing the gain of the input signal. But employing traditional voltage amplifiers for increasing the gain has its own set of problems and one of them being introduction of uncontrolled noise along with the electric signal. Thus, voltage amplifiers are used in the earlier stages of the signal processing/amplification to reduce the noise. This aforesaid operation is normally employed in the pixel itself. However, even in-pixel amplification also has its own set of disadvantages.

Employing amplifiers in the array of pixels consumes a lot of circuit area and makes the circuitry, inherently bulky and power-hungry. The fill-factor and the spatial resolution are thus compromised. For example, drone cameras would prefer a circuitry which is power-friendly and not bulky, which would otherwise effect the agility of the drones.

The current state-of-the-art signal amplification methods that enhance low light imaging capability can be broadly categorized as follows:

a) Signal enhancement in charge domain: This involves using extremely high voltages (10-20 V) at the photodetector site to cause avalanche multiplication of charge. The resultant image quality is significantly enhanced but the process is power consuming and very costly.

b) Using voltage amplifiers in the pixel or column of a CMOS image sensor: The voltage amplifier provides gain to the signal but also introduces significant noise of its own into the signal. This limits the extent to which the image quality can be enhanced. Preference goes to inclusion of voltage amplifier as early in the signal chain as possible since this makes the noise appearing after the amplifier insignificant. Thus, pixel level amplification is preferred over column. However, an amplifier in the pixel consumes area, which adversely affect fill factor and spatial resolution.

c) Multiple capture and reconstruction: Instead of taking one image with a single exposure time, multiple images with varying exposure time are captured. For low light imaging, at least one of these exposure times has to be very large. Thereafter, these multiple shots are combined using on-chip signal processing techniques or off-chip reconstruction algorithms to produce final high dynamic range image. This process requires the column and chip level processing circuitry to work multiple times for a single final frame. Thus, the process is time consuming and power hungry.

Further, the problems of multiple capture of a single object and reconstruction of the image must also be avoided. Very often, camera sensors operate by capturing an image-object multiple times with varying exposure times. Thus, multiple snaps captured are combined, processed and then compared to select the best output signal with the optimum gain.

Again, this process of capturing multiple images of varying exposure times increase the clock-cycles of the circuitry; thereby making the entire process time-consuming and the circuit power-hungry.

Similarly, Photo multiplier tubes (PMTs) are based on the same principle of CCDs. This architecture uses phosphor screen as photo-cathodes which generates electrons in response to photon. The electrons travel through a high electric field in vacuum with high velocity. The electrons, now in a higher energy shell, are transferred through multi-channel photo multiplier tubes. Thereafter, they hit a screen made of phosphor which converts the high energy electrons back into light. Thus, in PMTs, a high gain is obtained due to increased number of photons, which in turn increases the photoelectric efficiency. The resultant effect is a requirement of additional hardware which makes a PMT circuitry bulky. There is a need to eliminate the necessity for multiple capturing an object in order to use a single-shot and a single-exposure method for digital image processing.

Single Photon Avalanche Diodes (SPADs) operate by applying a breakdown voltage in reverse bias condition so that the avalanche in the electric field produces multiple negatively charged carriers corresponding to a very few photons (or even one photon).

Also Image intensifiers with a phosphor screen are available which perform photon amplification. But these devices create an avalanche of photo-generated signal electrons using a photocathode exposed to the photons. The signal electrons are further multiplied using a set of plates. Since the human eye detects photons, a phosphor screen is used to convert the signal electrons back into photons. These devices are bulky since the multi-channel plates along with photocathode and phosphor screen consume significant area. The material of the photocathode can change according to application. These devices are also extremely expensive and power hungry.

Conventional CMOS sensors have enabled the single-chip design of an imaging system and have also provided a cost-effective alternative. However, conventional CMOS sensors suffer from low dynamic range (DR), when exposed to low-light or bright-light conditions, thereby affecting the image quality.

Additionally, multiple exposure techniques used in present hand held devices like mobile phones. Taking multiple frames with different exposure times is bandwidth and power hungry. Moreover, additional off chip processing steps are required for High Dynamic Range (HDR) reconstruction.

Therefore, conventional CMOS sensors operate in low-light conditions, but with low noise-suppression capabilities. Additionally, these existing CMOS sensors require longer clock cycles and require additional hardware components which make the circuitry bulky and power consuming. Also the above-mentioned solutions like image intensifiers, CCDs, EMCCDs, PMTs and SPADs all require extremely high voltages for operation. Thus, the incorporation of these devices in low light imaging application with area and budget constraints is difficult. Applications like hand-held battery powered devices cannot afford a high-power budget. Similarly, aerial devices with limited payload don't have space for bulky sensors. Such applications require low area and low power sensors with low light imaging capability. The available technologies also lack the single transistor-based, a single-shot, a single-exposure time approach for a digital signal processing with a high resultant gain. Thus, there is still requirement of good quality HDR images in low light environment using CMOS image sensor.

SUMMARY OF THE INVENTION

To solve the problems and short-comings of the above class of sensors, there lies a need for an effective, compact, economical, power-friendly CMOS sensor for generating a HDR (High Dynamic Range) image, more importantly in a low-light environment. The present invention discloses signal enhancement at a pixel level, without a need for a larger spatial area and with an increase in the circuit's power requirement. The present invention achieves a higher speed without using power hungry analog circuits with a high bandwidth requirement as done in multiple exposure technique. Thus, this invention involves low power, area-efficient pixel design compatible with CMOS technology which enhances the dynamic range for low light environments.

The necessity for a plurality of voltage amplifiers has been avoided, as it adds noise signals during the amplification of an input signal. Further, in an array of pixels using such voltage amplifiers, multiplies the noise signals. Thus, the present invention discloses use of a single charge transfer amplifier for increasing the gain of the electric signal, thereby making the sensor area-efficient and power-friendly. Furthermore, charge transfer amplification of signals enables single-frame capture and the entire signal processing operation is focused to the single frame/object captured. Therefore, the present invention is more efficient as an HDR image reconstruction is not necessary from a plurality of images captured at varying exposures.

The present invention discloses an improved high dynamic range CMOS image sensor with a novel pixel design for enabling a variable pixel gain through charge transfer amplification. In conventional pixels architecture, control of the gain is generally absent and is dependent on the signal sampling capacitance which operates before the in-pixel amplifier in the pixel's circuit. The resultant gain is thus fixed or static, as the value of the capacitance is itself fixed or static in a particular pixel. The present invention uses a single charge transfer amplifier, in place of a plurality of voltage amplifiers, for enhancing the dynamic range and hence gains of an electric signal.

The charge transfer amplifier is configured to buffer by storing the photo generated charge (photo-electron) in one of the nodes of the pixel circuit. The photo-electrons are generated when light is allowed to be incident on the photodiodes of the pixels for a certain period of time, being the integration time. Resultantly, the charge transfer amplifier enables the transfer of the photo-signal to the column circuit.

The column circuit of the pixel's architecture contains two types of capacitors, one for storage and the other for amplification. The ratio of this amplification capacitance and the storage capacitance decides the quantum of amplification of the electric signal during the processing. Both the capacitances are housed in the column circuit and may alternatively be termed as column capacitances. Thus, the present invention discloses a user-defined or a user's pre-configured gain limit for signal amplification using the variation of the column capacitances. The resultant amplification factor, is thus decided by the capacitances placed in the column circuit and renders a single-shot high dynamic range output image.

According to an embodiment illustrated herein, the present disclosure relates to a method for enhancing the dynamic range of a CMOS image sensor using charge transfer amplification. The method includes:

resetting the pixel array itself, and switches of the circuitry and the photodiode node, so that residual electrical current from previous operational cycles are drained or grounded;

receiving light for a predetermined duration on a pixel array, including a plurality of photodiodes, wherein the predetermined duration is an integration time or an exposure time;

configuring the integration time at the photodiode, for a desired exposure;

releasing photoelectrons/charges to form a current signal, which are stored temporarily in a gate acting as a storage node, in the CMOS sensor;

generating an equivalent voltage signal by allowing a voltage build-up of the storage capacitance by charging the storage capacitance; and thereafter adjusting the voltage build-up by adjusting a ratio between the storage capacitance and amplification capacitance, for further varying the differential voltage, to obtain an increased amplification factor of a charge transfer amplifier 214;

integrating the voltage signal from the storage capacitance $C_{STR}$ 206 with the current signal temporarily stored in the gate of the photodiode node PD 212 in order to obtain an integrated signal of amplified gain; and generating a resultant electronic signal with a higher amplification factor by processing the integrated signal through a readout circuit, and wherein the resultant electronic signal has an enhanced gain as compared to the input electronic signal.

Thus, the processing of the signal is implemented in a column buffer and the resultant electronic signal is then transferred to a column readout circuit for reconstruction of an image from the resultant electric signal.

The summary is provided to introduce the system and method of representative concepts in a simplified form that are further described below in the detailed description. This summary is not intended to limit the key essential features of the present invention nor its scope and application.

Other advantages and details about the system and the method will become more apparent to a person skilled in the art from the below detailed description of the invention when read in conjugation with the drawings.

BRIEF DESCRIPTION OF THE DRAWINGS

The accompanying drawings, which are incorporated in and constitute a part of this disclosure, illustrate exemplary embodiments and, together with the description, serve to explain the disclosed invention. In the figures, the digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
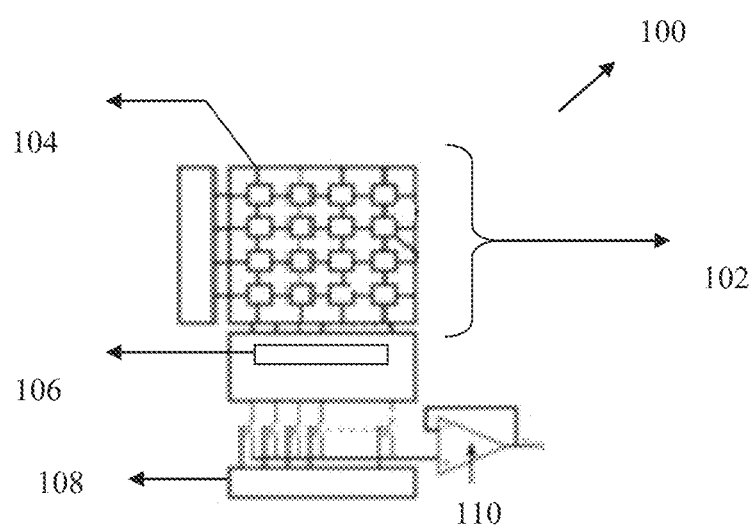
FIG. 1 is a block diagram that illustrates a conventional CMOS sensor.

It should be appreciated by those skilled in the art that any block diagram herein represents conceptual views of illustrative systems embodying the principles of the present subject matter. Similarly, it will be appreciated that any flow charts, flow diagrams, state transition diagrams, illustrative circuit architectures, and the like represent various processes which may be substantially executed by a computer or processor, whether or not such computer or processor is explicitly shown.

DETAILED DESCRIPTION OF ILLUSTRATIVE EMBODIMENTS

The present invention can be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application yield multiple alternative and suitable approaches to implement the functionality of any detail described herein. Therefore, any approach extends beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, circuit, architecture, characteristic, property, element, or limitation but that not every embodiment or example necessarily includes that particular feature, circuit, architecture, structure, characteristic, property, element, or limitation. Further, repeated use of the phrase "in an embodiment" does not necessarily refer to the same embodiment.

It is to be understood that the singular forms "a," "an," and "the" include plural referents unless the context clearly dictates otherwise.

The terms and words used in the following description are to be understood in the manner used by the inventor to enable and describe the invention. For further clarity and to enable better understanding of the invention, certain abbreviations/key terms are being defined herein under.

| Abbreviations | Meaning |
|---|---|
| PD | Photodiode/Photodetector |
| $S_{RST}$ | Reset Switch |
| $C_{STR}$ | Storage Capacitance |
| $C_{AMP}$ | Amplification Capacitance |
| CTA | Charge Transfer Amplifier |
| $S_{SEL}$ | Select Switch |
| $S_{STR}$ | Select switch for storage capacitor |
| $V_{DD}$ | Terminal Voltage |
| COL_STR | Column Storage Node |
| PIXEL O/P | Pixel Output Node |

The improved high dynamic range CMOS image sensor operates by boosting the dynamic range by employing a charge transfer amplification method to the input electric signal. The input electric signal is obtained by exposing the photodiode to the incident light. The incident light is ideally in the visible spectrum of white light. In other embodiments, the incident light may also have wavelengths in infrared region of the electromagnetic spectrum. The present invention discloses a novel pixel architecture capable of providing variable or configurable pixel gain through charge transfer amplification. In an embodiment the charge transfer amplification involves dynamically integrating a signal between the capacitive nodes in proportion to the size of a differential input voltage.

By appropriately configuring the relative impedances between the column capacitors, gain amplification of a signal occurs by integrating the current-voltage relationship of the column capacitors. The advantage of using charge transfer amplification is that the method employs minimal static power and hence, the circuitry works with a lower dynamic power.

The improved high dynamic range CMOS image sensor in accordance to the present invention enhances the following:

pixel gain or gain of input signal by enhancing the dynamic range of the resultant signal by employing the charge transfer mechanism;

dynamic range, wherein one of the transistors is a charge transfer amplifier;

signal to noise ratio by eliminating the need for a plurality of voltage amplifiers in the pixel arrays; and signal, by configuring the capacitances of the column capacitance to a ratio, wherein the voltage signal may augment the weak current signal integrated due to a low availability of photons.

The improved high dynamic range of the CMOS image sensor is enhanced, competent, efficient, compact, and economical and uses the method of charge transfer amplification, to enhance the resultant signal gain and the signal to noise ratio in the low-light environment. Further, it also consumes less power during low-light photography. The resultant gain is thus fixed or static as the value of the capacitance is itself fixed or static in a particular pixel. The present invention uses only a charge transfer amplifier, in place of a plurality of voltage amplifiers, for enhancing the dynamic range and hence gains of an electric signal.

The resultant gain of the electric signal is enhanced due to a proportionate operation of the column capacitances, i.e. the storage capacitance and the amplifier capacitance. It is the ratio of the column capacitances which generates an optimum voltage build-up to augment the gain of the input electric signal. In an exemplary embodiment, the input electric signal is a result of the charges or photoelectrons generated by the photodiode when exposed to incident light for a definite period of time.

FIG. 1 is a block diagram that illustrates a conventional CMOS sensor 100. The conventional CMOS sensor 100 includes a pixel array 102, a plurality of pixels (core) 104, a column readout 106, a column decoder 108 and a column level buffer 110. The pixel array 102 includes a plurality of pixels 104 as a unit of area, where light is incident on the plurality of pixels 104. Each pixel core 104 has a photodiode, which is sensitive to incident light of the visible spectrum. The pixel array 102 is communicatively coupled to the column readout 106, which is a circuit used to convert information on variation of capacitance due to an external acceleration into a voltage signal. It is mainly a photocurrent in voltage terms by reading it from the pixel array 102. The column readout 106 is connected to the column decoder 108 which selects pairs of bit lines from the pixel array 102 and represents the data stored in bits as a readable output. FIG. 1 thereby illustrates a basic schematic requirement for a conventional CMOS sensor 100 which provides photography in low light but with noise. Further, the conventional CMOS sensor 100 consumes more power during low-light photography. The conventional CMOS sensor depends on a plurality of voltage amplifiers and may also require several image shots to select the best image or reconfigure an image from a plurality of input signals having varying dynamics. Thus, a need was felt for a more effective, competent, efficient, compact, less power consuming, economical and a high dynamic range CMOS image sensor which uses charge transfer amplification to enhance the signal gain for enhanced operation in a low-light condition.

Figure 2:
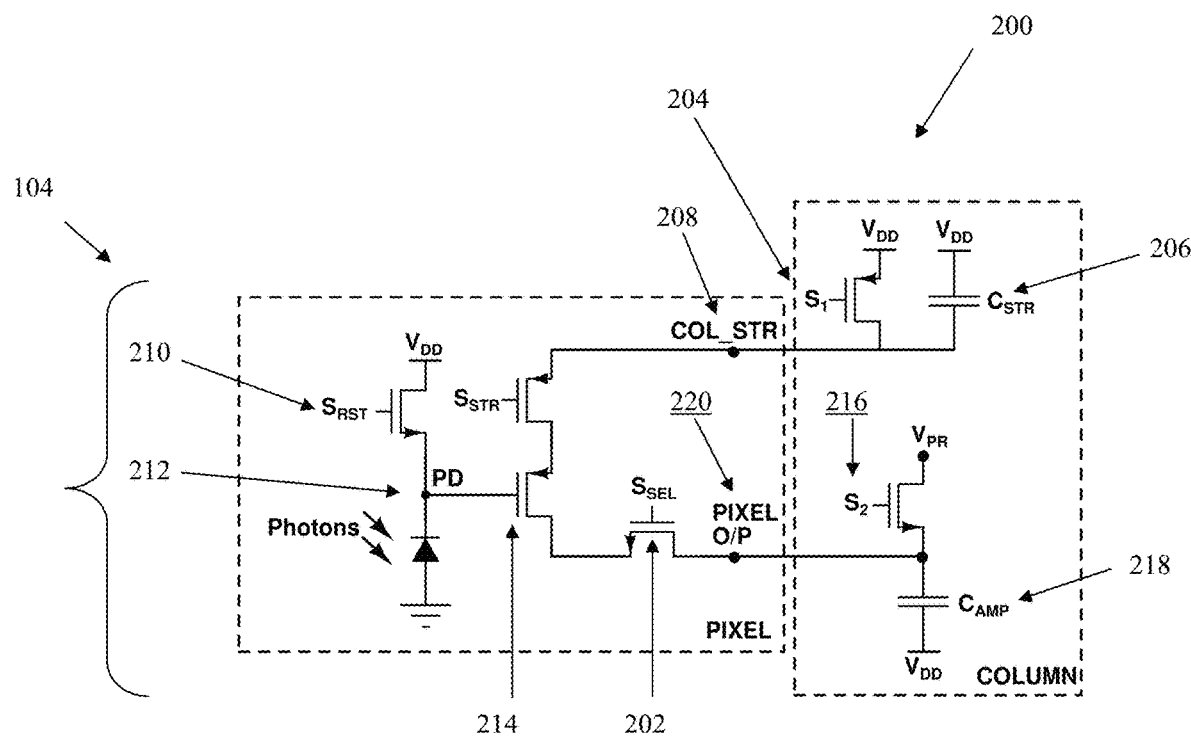
FIG. 2 is a block diagram that illustrate a circuit architecture of an improved high dynamic range CMOS image sensor using charge transfer amplification, in accordance with the present invention.

FIG. 2 is a block diagram that illustrates a circuit architecture of the CMOS image sensor using charge transfer amplification. The circuit architecture of the CMOS image sensor 200 includes a $S_{SEL}$ and $S_{STR}$ switch 202, S1 switch 204, a storage capacitor $C_{STR}$ 206, a $COL_{STR}$ node 208, a reset switch $S_{RST}$ 210, a photodiode PD 212, a charge transfer amplifier 214, switch S2 216, an amplifier capacitor CAMP 218, and a pixel output node PIXELO/P 220.

In an embodiment, the photodetector 212 is pinned to every pixel in the pixel array 102. The pixel array 102 includes a plurality of pixel cores as a unit of area, where light is incident on the pixel cores (or pixels 104). In an embodiment, the pixel array 102 is a layered substrate. In an exemplary embodiment, an electromagnetic radiation may be light, from the range of infrared to visible light. In an embodiment, the photodetector 212 is an n-well/p-sub photodiode or a pinned photodiode or any other photodiode configured to integrate incident light.

In operation of the improved high dynamic range CMOS image sensor performing charge transfer amplification, initially the CMOS sensor circuitry is reset as a whole to drain/ground any residual signals from the previous operational cycles. The storage capacitor $C_{STR}$ 206 is reset by turning ON S1 switch 204. The turning ON of switch S1 allows voltage build up across the storage capacitor $C_{STR}$ 206 from its corresponding voltage terminal. The reset switch $S_{RST}$ 210 is switched ON to reset the gates of the photodiode PD 212 and also the charge transfer amplifier 214. In another embodiment the charge transfer amplifier 214 may be an in-pixel amplifier. Simultaneously, the other column capacitor being the amplifier capacitor CAMP 218 is pre-charged to its terminal voltage by turning ON the switch S2 216. In an embodiment, the storage capacitor $C_{STR}$ 206 is at a higher potential as compared to the amplifier capacitor CAMP 218 and a differential voltage is built at node $COL_{STR}$ 208. Overall, the pixel array 102 and other nodes of the CMOS image sensor circuit are reset.

At this point, available light is made incident on the photodiode PD 212 for a definite period of time and this phase of integration may be called as an integration time or exposure period. After the integration, an input electronic signal is generated due to the photoelectrons released corresponding photons incident on the photodiode PD 212. The signal produced as a result of a low-light condition is weak and has a lower gain factor. If any image is reconstructed directly from this signal, the resultant image may be unclear, with an inferior dynamic range and hence of an inferior quality.

Further, the resultant image reconstructed from a weak electronic signal shall be further laden with noise.

The weak signal is integrated with the voltage build-up or the voltage signal stored in the $COL_{STR}$ 208 node. The electronic signal is integrated on the photodiode PD 212 gate and at the gate of the charge transfer amplifier 214. The source terminal of the charge transfer amplifier 214 which is represented by the node $COL_{STR}$ 208 when $S_{STR}$ 202 is ON follows the gate terminal of the charge transfer amplifier. The change in the $COL_{STR}$ 208 is proportional to the change of voltage on PD 212 due to integrated charges. The charges on the $COL_{STR}$ node 208 must be supplied by the PIXELO/P 220 node as there is no other charge transfer path. Since, the channel in the CMOS sensor circuitry between the $COL_{STR}$ node 208 and the pixel output node PIXELO/P 220 has a voltage potential, and that the output node PIXELO/P 220 being at a lower potential, the integrated signal flows through the charge transfer amplifier 214 to the output. In the due course due to the integration, the gain of the input electric signal is enhanced.

In another embodiment of the invention, a method for pixel embedded signal amplification using the improved high dynamic range CMOS image sensor 200 is disclosed. The method includes:

resetting the switches S1204, S2216, $S_{RST}$ 210 and the column capacitors $C_{STR}$ 206 and CAMP 218, of the circuitry and the photodiode node PD 212, so that residual electronic current from previous operational cycles are drained or grounded;

receiving light for a predetermined duration on the pixel array 102, including a plurality of photodiodes 104, wherein the predetermined duration is an integration time or an exposure time;

configuring the integration time at the photodiode 104, for a desired exposure on a frame, by controlling a capacitive impedance of the photodiode;

releasing photoelectrons/charges to form a current signal, which is stored temporarily in a gate of the photodiode PD 212 acting as a storage node, in the CMOS sensor;

generating an equivalent voltage signal by allowing a voltage build-up of the storage capacitance by charging the storage capacitance $C_{STR}$ 206, and thereafter adjusting the voltage build-up by adjusting a ratio between the storage capacitance and amplification capacitance, for further varying the differential voltage, to obtain an increased amplification factor of a charge transfer amplifier 214;

integrating the said voltage signal from the storage capacitance $C_{STR}$ 206 with the current signal temporarily stored in the gate of the photodiode node PD 212, by configuring the impedance of the amplification capacitor CAMP 218 to a value lesser that the storage capacitor $C_{STR}$ 206, in order to obtain an amplified gain of the integrated signal; and generating a resultant electronic signal with a higher amplification factor by processing the integrated signal through a readout circuit.

Figure 3:
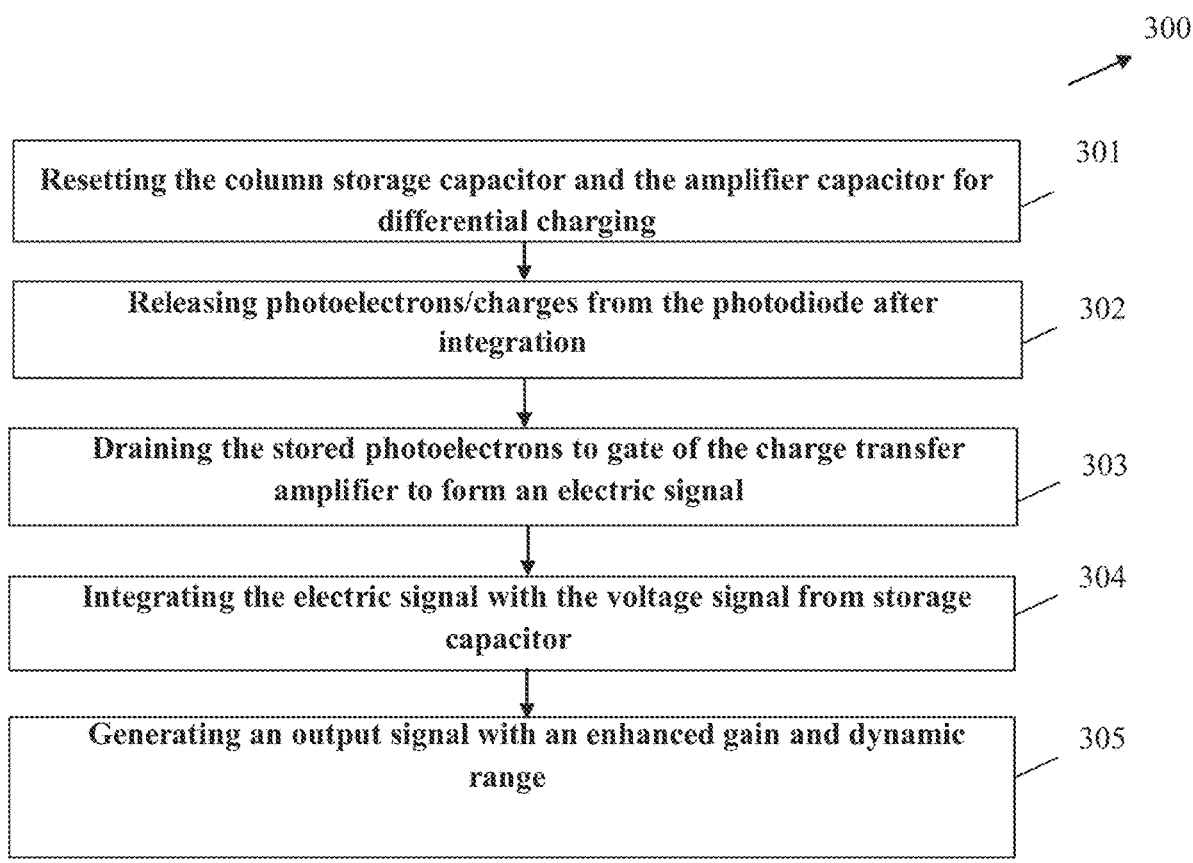
FIG. 3 is a flow chart that illustrates a method for enhancing the high dynamic range CMOS image sensor by charge transfer amplification.

FIG. 3 is a flow chart 300 that illustrates a method for enhancing the dynamic range of the CMOS image sensor 200 by charge transfer amplification. The dynamic range of an electric signal is enhanced due to the amplification factor of the CMOS image sensor 200. The following steps illustrate the method steps of the present disclosure.

At step 301, the CMOS sensor 200 circuit is reset. This includes resetting the column's storage capacitor $C_{STR}$ 206 by switching ON S1 switch 204. Thereafter, S1 switch 204 is turned OFF (shorted) to allow capacitance build-up of storage capacitor $C_{STR}$ 206 from its corresponding voltage terminal. This voltage build-up is stored in the node $COL_{STR}$ 208. Furthermore, the reset switch $S_{RST}$ 210 is switched ON to reset the gates of the photodiode PD 212 and also the charge transfer amplifier 214. Simultaneously, the other column capacitor being the amplifier capacitor CAMP 218 is pre-charged to its terminal voltage by turning ON the switch S2 216. In an embodiment, the storage capacitor $C_{STR}$ 206 is at a higher potential as compared to the amplifier capacitor CAMP 218 and a differential voltage is built at node $COL_{STR}$ 208.

At step 302, light is made incident on the photodiode for a definite period of time and this phase of integration may be called as an integration time. For example, the incident light may range from the infrared (IR) radiation to the white light frequencies of the electromagnetic spectrum. After integration, an input electronic signal is generated due to the photoelectrons released corresponding photons incident on the photodiode PD 212. The electronic signal produced as a result of a low-light condition is weak and has a lower gain factor. If any image is reconstructed directly from this signal, the resultant image may be unclear, with an inferior dynamic range and hence of an inferior quality. Further, the resultant image reconstructed from a weak electric signal may be laden with noise. At this point the electronic signal generated due to the integration has a weak voltage potential compared to the voltage build-up at the $COL_{STR}$ 208 node.

At step 303, the charge transfer amplifier 214 and the switch $S_{SEL}$ 202 is activated so as to form a drain. The current signal is stored at the gate of the photodiode PD 212 by varying its impedance.

At step 304, the current signal which has a weak voltage, is made to integrate with the voltage signal, already stored at the $COL_{STR}$ 208 node. The integration of the signals occurs at the input gate of the charge transfer amplifier 214. The electronic signal is integrated on the photodiode PD 212 and at the gate of the charge transfer amplifier 214. The source terminal of the charge transfer amplifier 214 which is represented by the node $COL_{STR}$ 208 when $S_{STR}$ 202 is ON follows the gate terminal of the charge transfer amplifier. The change in the $COL_{STR}$ 208 is proportional to the change of voltage on the PD 212 due to integrated charges. The charges on the $COL_{STR}$ node 208 must be supplied by the PIXELO/p 220 node as there is no other charge transfer path. Since, the channel in the CMOS sensor circuitry between the $COL_{STR}$ node 208 and the pixel output node PIXELO/P 220 has a voltage potential, and that the output node PIXELO/P 220 being at a lower potential, the integrated signal flows through the charge transfer amplifier 214 to the output. In the due course due to the integration, the gain of the input electric signal is enhanced.

Finally, at step 305, a resultant signal generated due to the integration is made to flow through a readout circuit for reconstruction of an image from the resultant signal. The resultant signal thus has an enhanced gain as compared to the input electric signal. In an exemplary embodiment, this amplification factor or the enhancement of the gain can be achieved in a single frame as per a desired single exposure setting of a user.

Figure 4:
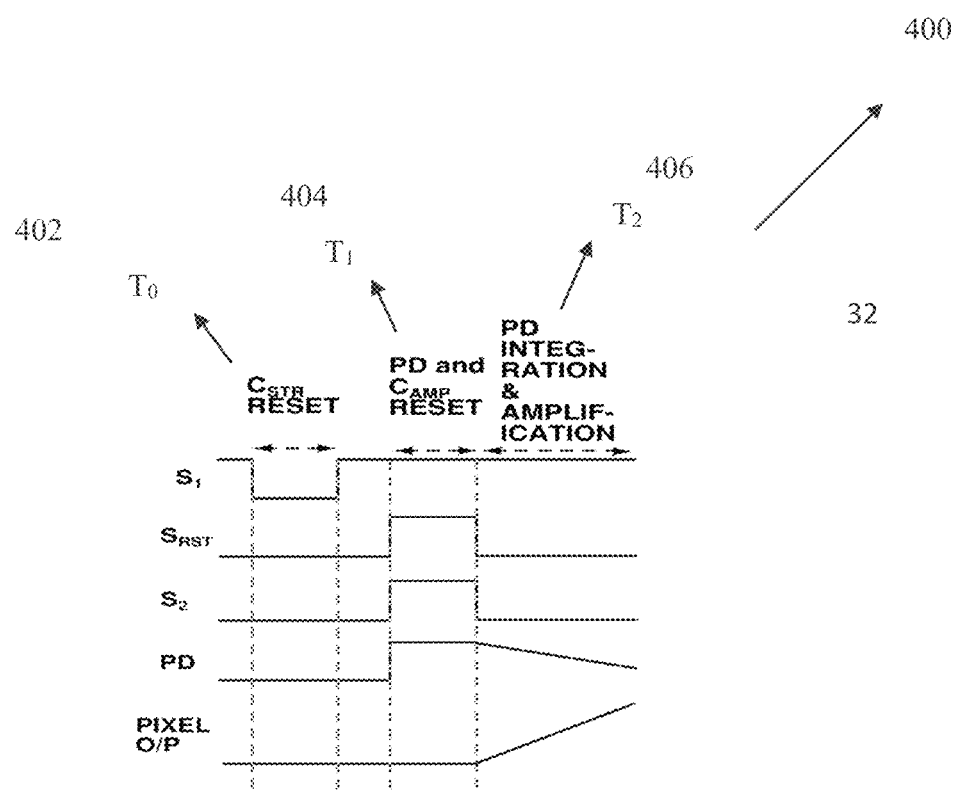
FIG. 4 illustrates a timing diagram architecture of the improved high dynamic range CMOS image sensor in accordance with the present invention.

FIG. 4 illustrates a timing diagram architecture of the CMOS image sensor 200 using the charge transfer amplification, in accordance with the present invention. The timing diagram describes an implementation of the method steps as a clocking cycle at every consecutive interval. The operation starts at T0 402 and ends at T2 406. The fewer clocking cycles is exemplary of the speed of operation of the CMOS image sensor 200 circuit. Further, with fewer components the CMOS image sensor 200 circuit is less bulky and power-friendly.

$T_0$ 402 is the Reset phase. At this stage of resetting, the column's storage capacitor $C_{STR}$ 206 is activated by switching ON the S1 switch 204.

Thereafter, S1 switch 204 is turned OFF (shorted) to allow capacitance build-up of storage capacitor $C_{STR}$ 206 from its corresponding voltage terminal. This voltage build-up is stored in the node $COL_{STR}$ 208. This phase basically involves resetting.

At T1 404, the reset switch $S_{RST}$ 210 is switched ON to reset the gates of the photodiode PD 212 and also the charge transfer amplifier 214. Simultaneously, the other column capacitor being the amplifier capacitor CAMP 218 is precharged to its terminal voltage by turning ON the switch S2 216. In an embodiment, the storage capacitor $C_{STR}$ 206 is at a higher potential as compared to the amplifier capacitor CAMP 218 and a differential voltage is built at node $COL_{STR}$ 208

$T_2$ 406 is the integration stage, which defines for how long the plurality of pixels 104 are exposed to incident electromagnetic radiation. The integration time or the exposure period is defined as the time duration for which the photons are collected in the plurality of pixels 104. Once the photons are integrated in the plurality of pixels 104, electrons are released from the photodiode 202. The current signal which has a weak voltage is made to integrate with the voltage signal, already stored at the $COL_{STR}$ 208 node. The integration of the signals occurs at the input gate of the charge transfer amplifier 214. At this stage, the charge transfer amplifier 214 converts the integrated electric signal from the gate of the photodiode gate PD 212 to a voltage signal. The difference of the potential in the voltage between the $COL_{STR}$ node 208 and the column transfer amplifier 214, pulls the electric signal from the photodiode PD 212, for integration of the electric signal and the voltage signal. Since, the channel in the CMOS sensor circuitry between the $COL_{STR}$ node 208 and the pixel output node PIXELO/P 220 has a voltage potential, and that the output node PIXELO/P 220 being at a lower potential, the integrated signal flows through the charge transfer amplifier 214 to the output. In the due course due to the integration, the gain of the input electric signal is enhanced.

In another embodiment of the invention, an image processor which is linked to the CMOS sensor 200, determines corresponding intensities of each raw color component of light by measuring the amount of accumulated charge in the plurality of pixels 104. In an exemplary embodiment, the plurality of pixels 104 in the resulting digital image are represented by color component values, which may be red, green and blue components, although other digital color may be represented as well. Also, a memory is present which is communicatively connected to the processor and stores processor instructions. The memory on execution, causes the processor to receive light for a predetermined duration on a pixel array and perform the method steps of the present disclosure.

In an embodiment, the processor includes suitable logic, circuitry, interfaces, and/or code that are configured to execute a set of instructions stored in the memory. The processor is configured to be implemented based on a number of processor technologies known in the art. Examples of the processor include, but not limited to, image processors or digital signal processors or, an X86-based processor, a Reduced Instruction Set Computing (RISC) processor, an Application-Specific Integrated Circuit (ASIC) processor, a Complex Instruction Set Computing (CISC) processor, and/or other processor. In an embodiment, the CMOS image sensor 200 may also be equipped with a transmitter for remote operations.

The memory may include suitable logic, circuitry, interfaces, and/or code that are configured to store the set of instructions, which is executed by the processor. The memory is configured to store one or more programs, routines, or scripts that is executed in coordination with the processor. The memory may be implemented based on a Random Access Memory (RAM), a Read-Only Memory (ROM), a Hard Disk Drive (HDD), a storage server, and/or a Secure Digital (SD) card.

A description of an embodiment with several components in communication with each other does not imply that all such components are required. On the contrary, a variety of optional components are described to illustrate the wide variety of possible embodiments of the invention. The present disclosure may be realized in hardware, or a combination of hardware and software. The present disclosure may be realized in a centralized fashion, in at least one processing system, or in a distributed fashion, where different elements may be spread across several interconnected systems or circuits.

Further, any of the methods described herein may be totally or partially performed using a digital camera, including one or more processors, which is configured to perform the steps described herein above. Thus, embodiments are directed towards a digital camera including specific components to perform specific steps of any of the methods described herein above. Additionally, any of the steps of any of the methods can be performed using specific circuits.

A person with ordinary skills in the art will appreciate that the systems, circuit elements, modules, and submodules have been illustrated and explained to serve as examples and should not be considered limiting in any manner. It will be further appreciated that the variants of the above disclosed circuit elements, modules, and other features and functions, or alternatives thereof, may be combined to create other different systems or applications.

While the present disclosure has been described with reference to certain embodiments and exemplary embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope.

What is claimed is:

1. A method for enhancing the dynamic range of a CMOS image sensor (200) by charge transfer amplification, the method comprising:
    resetting a storage column capacitor ($C_{STR}$206), an amplification column capacitor ($C_{AMP}$218), a storage capacitor reset switch ($S_1$204), an amplification capacitor pre-charge switch ($S_2$216), a photodiode reset switch ($S_{RST}$210), and a photodiode node (PD 212);
    receiving light for a predetermined duration on a pixel array (102), including a plurality of photodiodes (104);
    configuring an integration time at the plurality of photodiodes (104), for a desired exposure;
    releasing photoelectrons/charges to form a current signal, which is stored temporarily at the photodiode node (PD 212);
    generating an equivalent voltage signal by allowing a voltage build-up of a storage capacitance by charging the storage column capacitor ($C_{STR}$206), and thereafter adjusting the voltage build-up by adjusting a ratio between the storage capacitance and an amplification capacitance of the amplification column capacitor ($C_{AMP}$218), for further varying the differential voltage, to obtain an increased amplification factor of a charge transfer amplifier (214);
    integrating the said voltage signal from the storage capacitor ($C_{STR}$206) with the current signal temporarily stored in the photodiode node (PD 212) in order to obtain an integrated signal of amplified gain; and generating a resultant electronic signal with a higher amplification factor, wherein the resultant electronic signal has an enhanced gain as compared to the input electronic signal.

2. The method for enhancing the dynamic range of a CMOS image sensor (200) as claimed in claim 1, further comprising resetting the pixel array 102 by at least switching ON the storage capacity reset switch ($S_1$ 204), the amplification capacitor pre-charge switch ($S_2$ 216), and the photodiode reset switch ($S_{RST}$ 210).

3. The method for enhancing the dynamic range of a CMOS image sensor (200) as claimed in claim 1, wherein the resetting of the storage column capacitor $C_{STR}$ 206 is by switching ON the storage capacitor reset switch ($S_1$ 204).

4. The method for enhancing the dynamic range of a CMOS image sensor (200) as claimed in claim 1, wherein the resetting of the photodiode node (PD 212) is by switching ON the photodiode reset switch ($S_{RST}$ 210).

5. The method for enhancing the dynamic range of a CMOS image sensor (200) as claimed in claim 1, wherein the step of resetting drains or grounds residual electronic current from previous operational cycles.

6. The method for enhancing the dynamic range of a CMOS image sensor (200) as claimed in claim 1, wherein the predetermined duration is an integration time or an exposure time.

7. The method for enhancing the dynamic range of a CMOS image sensor (200) as claimed in claim 1, wherein the integrated signal is generated by configuring the impedance of the amplification column capacitor ($C_{AMP}$ 218) to a value lesser that the storage column capacitor ($C_{STR}$ 206).

8. The method for enhancing the dynamic range of a CMOS image sensor (200) as claimed in claim 1, wherein the resultant electronic signal is obtained by processing the integrated signal through a readout circuit for reconstruction of an image.

9. A CMOS image sensor (200), which enhances dynamic range by configuring a variable gain of a charge transfer amplifier (214), the CMOS image sensor (200), system comprises:
a processor; and
a memory communicatively coupled to the processor, wherein the memory stores processor instructions, which on execution, causes the CMOS image sensor (200) to:
reset a storage column capacitor ($C_{STR}$ 206), an amplification column capacitor ($C_{AMP}$ 218), a storage capacitor reset switch ($S_1$ 204), an amplification capacitor pre-charge switch ($S_2$ 216), a photodiode reset switch ($S_{RST}$ 210), and a photodiode node (PD 212);
receive light for a predetermined duration on a pixel array (102), including a plurality of photodiodes (104);
configure an integration time at the plurality of photodiodes (104), for a desired exposure, by controlling a capacitive impedance of the plurality of photodiodes (104);
release photoelectrons/charges to form a current signal, which is stored temporarily in the photodiode node (PD 212);
generate an equivalent voltage signal by allowing a voltage build-up of storage capacitance by charging the storage column capacitor ($C_{STR}$ 206), and further comprising adjusting the voltage build-up by adjusting a ratio between the storage capacitance and an amplification capacitance of the amplification column capacitor ($C_{AMP}$ 218), for varying the differential voltage, to obtain an increased amplification factor of the charge transfer amplifier (214);
integrate the said voltage signal from the storage capacitor ($C_{STR}$ 206) with the current signal temporarily stored in the photodiode node (PD 212) in order to obtain an integrated signal of amplified gain; and
generate a resultant electronic signal with a higher amplification factor, wherein the resultant electronic signal has an enhanced gain as compared to the input electric signal.

10. The CMOS image sensor (200) as claimed in claim 9, wherein the pixel array (102) is reset by at least switching ON the storage capacitor reset switch ($S_1$ 204), the amplification capacitor pre-charge switch ($S_2$ 216), and the photodiode reset switch ($S_{RST}$ 210).

11. The CMOS image sensor (200) as claimed in claim 9, wherein the storage column capacitor ($C_{STR}$ 206) is reset by switching ON the storage capacitor reset switch ($S_1$ 204).

12. The CMOS image sensor (200) as claimed in claim 9, wherein the photodiode (PD 212) is reset by switching ON the reset switch $S_{RST}$ 210.

13. The CMOS image sensor (200) as claimed in claim 9, wherein the step of resetting drains or grounds residual electronic current from previous operational.

14. The CMOS image sensor (200) as claimed in claim 9, wherein the predetermined duration is an integration time or an exposure time.

15. The CMOS image sensor (200) as claimed in claim 9, wherein the integrated signal is generated by configuring the impedance of the amplification column capacitor ($C_{AMP}$ 218) to a value lesser that the storage column capacitor ($C_{STR}$ 206).

16. The CMOS image sensor (200) as claimed in claim 9, wherein the resultant electronic signal is obtained by processing the integrated signal through a readout circuit for reconstruction of an image.

17. A CMOS image sensor (200), which enhances dynamic range by configuring a variable gain of a charge transfer amplifier (214), the CMOS image sensor (200), system comprises:
a storage capacitor reset switch ($S_1$ 204), an amplification capacitor pre-charge switch ($S_2$ 216), and a photodiode reset switch ($S_{RST}$ 210) configured to,
reset a photodiode node (PD 212) and the charge transfer amplifier (214), by switching on the photodiode reset switch ($S_{RST}$ 210), wherein the photodiode node (PD 212) is layered on a silicon substrate, and
reset a storage capacitor ($C_{STR}$ 206) by switching on the storage capacitor reset switch ($S_1$ 204) and
reset an amplifier capacitor ($C_{AMP}$ 218) by switching on the amplification capacitor pre-charge switch ($S_2$ 216);
the storage capacitor ($C_{STR}$ 206) and the amplifier capacitor ($C_{AMP}$ 218) configured to create a voltage signal due to a differential voltage created between the storage capacitor ($C_{STR}$ 206) and the amplifier capacitor ($C_{AMP}$ 218);
a storage node ($COL_{STR}$ 208), configured to store the voltage signal;
the photodiode node (PD 212) configured to produce a current signal due to the photoelectrons released due to an electromagnetic radiation incident on the photodiode node (PD 212), wherein an exposure time on the photodiode node (PD 212) is preconfigured by a user;
an activate switch ($S_{SEL}$ 202), configured to activate the charge transfer amplifier (214) to form a drain between the storage node (COL$_{STR}$ 208) and a pixel output node (Pixel$_{O/P}$ 220), for integration of the voltage signal with the current signal at the input gate of the charge transfer amplifier (214) to form a resultant signal; and a readout circuit connected to terminals of the pixel output node (Pixel$_{O/P}$ 220), configured to re-generate a resultant image with an enhanced gain and dynamic range.

18. The CMOS image sensor (200) as claimed in claim 17, wherein the photodiode node (PD 212) is an n-well/p-sub photodiode or a p+/n-well/p-sub pinned photodiode.

19. The CMOS image sensor (200) as claimed in claim 17, wherein the silicon substrate is configured to house a plurality of photodiode nodes.

20. The CMOS image sensor (200) as claimed in claim 17, wherein the storage capacitor (C$_{STR}$206) and the amplifier capacitor (C$_{AMP}$ 218) are connected to respective terminal voltages to create a differential voltage.

21. The CMOS image sensor (200) as claimed in claim 20, wherein the differential voltage is also created by configuring the storage capacitor (C$_{STR}$206) to a higher voltage potential and configuring the amplifier capacitor (C$_{AMP}$ 218) to a lower voltage potential, to form storage capacitance and amplification capacitance respectively.

* * * * *